(12) United States Patent
Chin et al.

(10) Patent No.: US 9,034,959 B2
(45) Date of Patent: May 19, 2015

(54) POLYCARBONATE RESIN COMPOSITION AND ARTICLE INCLUDING SAME

(71) Applicant: Cheil Industries Inc., Gumi-si (KR)

(72) Inventors: Kyuong-Sik Chin, Uiwang-si (KR); Jong-Tae Yoon, Uiwang-si (KR); Seung-Shik Shin, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 13/924,954

(22) Filed: Jun. 24, 2013

(65) Prior Publication Data
US 2013/0289179 A1    Oct. 31, 2013

Related U.S. Application Data

(63) Continuation-in-part of application No. PCT/KR2011/009992, filed on Dec. 22, 2011.

(30) Foreign Application Priority Data

Dec. 31, 2010   (KR) .................. 10-2010-0140771
Dec. 9, 2011    (KR) .................. 10-2011-0132316

(51) Int. Cl.
| | | |
|---|---|---|
| C08K 5/523 | (2006.01) | |
| C08L 69/00 | (2006.01) | |
| C08G 77/04 | (2006.01) | |
| C08G 77/448 | (2006.01) | |
| C08L 51/00 | (2006.01) | |
| C08L 55/02 | (2006.01) | |

(52) U.S. Cl.
CPC .............. *C08K 5/523* (2013.01); *C08G 77/04* (2013.01); *C08G 77/448* (2013.01); *C08L 51/00* (2013.01); *C08L 55/02* (2013.01); *C08L 69/00* (2013.01)

(58) Field of Classification Search
None
See application file for complete search history.

(56) References Cited

U.S. PATENT DOCUMENTS

| | | | | |
|---|---|---|---|---|
| 5,488,086 | A | 1/1996 | Umeda et al. | |
| 6,127,465 | A * | 10/2000 | Nodera | 524/125 |
| 6,197,857 | B1 * | 3/2001 | Nodera et al. | 524/141 |

(Continued)

FOREIGN PATENT DOCUMENTS

| | | |
|---|---|---|
| CN | 101248138 A | 8/2008 |
| EP | 0517927 A1 | 6/1999 |

(Continued)

OTHER PUBLICATIONS

International Search Report in counterpart International Application No. PCT/KR2011/009992 dated Jul. 2, 2012, pp. 1-4.

(Continued)

*Primary Examiner* — Robert S Loewe
(74) *Attorney, Agent, or Firm* — Additon, Higgins & Pendleton, P.A.

(57) ABSTRACT

A polycarbonate resin composition includes: (D) about 1 to about 10 parts by weight of a silicon-based resin; (E) about 1 to about 10 parts by weight of a core-shell graft copolymer; and (F) about 1 to about 20 parts by weight of a flame retardant, with respect to about 100 parts by weight of a base resin including: (A) about 70 to about 90 wt % of a polycarbonate resin; (B) about 9 to about 25 wt % of a polysiloxane-polycarbonate copolymer; and (C) about 1 to about 10 wt % of an aromatic vinyl-based graft copolymer. The polycarbonate resin composition can have improved releaseability and external appearance, and excellent impact strength and coloring.

14 Claims, 1 Drawing Sheet

(56) References Cited

U.S. PATENT DOCUMENTS

| | | | |
|---|---|---|---|
| 6,355,767 B1 | 3/2002 | Takagi | |
| 6,465,555 B1* | 10/2002 | Nodera et al. | 524/414 |
| 6,576,706 B1* | 6/2003 | Nodera et al. | 525/67 |
| 6,827,882 B1 | 12/2004 | Kitayama et al. | |
| 6,956,073 B2* | 10/2005 | Takagi et al. | 524/127 |
| 6,987,141 B2* | 1/2006 | Okamoto et al. | 524/494 |
| 7,166,687 B2* | 1/2007 | Venderbosch et al. | 528/196 |
| 7,498,401 B2* | 3/2009 | Agarwal | 528/201 |
| 7,544,745 B2 | 6/2009 | Ma et al. | |
| 7,553,895 B2 | 6/2009 | An et al. | |
| 7,649,051 B2* | 1/2010 | Ma et al. | 525/196 |
| 7,649,057 B2* | 1/2010 | DeRudder et al. | 525/464 |
| 7,709,562 B2* | 5/2010 | Li et al. | 524/108 |
| 7,723,428 B2* | 5/2010 | DeRudder et al. | 524/537 |
| 7,858,700 B2* | 12/2010 | Bhat et al. | 525/101 |
| 7,935,777 B2* | 5/2011 | de Kraker et al. | 528/125 |
| 8,222,350 B2* | 7/2012 | DeRudder | 525/461 |
| 2002/0016392 A1* | 2/2002 | Nodera | 524/311 |
| 2004/0030044 A1* | 2/2004 | Okamoto et al. | 525/63 |
| 2006/0052519 A1* | 3/2006 | Nodera et al. | 524/588 |
| 2008/0011513 A1* | 1/2008 | Kamps et al. | 174/565 |
| 2011/0028615 A1* | 2/2011 | Li et al. | 524/140 |

FOREIGN PATENT DOCUMENTS

| | | |
|---|---|---|
| JP | 2001-026707 A | 1/2001 |
| JP | 2001-106892 A | 4/2001 |
| KR | 10-2009-0020648 A | 2/2009 |
| WO | 2012/091362 A2 | 7/2012 |

OTHER PUBLICATIONS

Office Action in counterpart Korean Application No. 10-2011-0132316 dated Mar. 11, 2014, pp. 1-5.

Office Action in counterpart Chinese Application No. 201180063333.3 dated Apr. 30, 2014, pp. 1-7.

English-translation of Office Action in counterpart Chinese Application No. 201180063333.3 dated Apr. 30, 2014, pp. 1-8.

* cited by examiner

POLYCARBONATE RESIN COMPOSITION AND ARTICLE INCLUDING SAME

CROSS-REFERENCE TO RELATED APPLICATIONS

This application is a continuation-in-part of International Application No. PCT/KR2011/009992, filed Dec. 22, 2011, pending, which designates the U.S., published as WO 2012/091362 and is incorporated herein by reference in its entirety, and claims priority therefrom under 35 USC Section 120. This application also claims priority under 35 USC Section 119 to and the benefit of Korean Patent Application No. 10-2010-0140771, filed Dec. 31, 2010, and Korean Patent Application No. 10-2011-0132316, filed Dec. 9, 2011, the entire disclosure of each of which is incorporated herein by reference.

FIELD OF THE INVENTION

The present invention relates to a polycarbonate resin composition and a molded article including the same.

BACKGROUND OF THE INVENTION

PC/ABS compositions generally include a polycarbonate (PC), an acrylonitrile butadiene styrene copolymer (ABS), and a phosphorus flame retardant. Such PC/ABS compositions are used for exterior materials and component materials of electronic products requiring high gloss, high flowability, high impact strength, and the like.

A PC/ABS composition is generally opaque. However, in products requiring high gloss and deep black coloration, optical properties of the PC/ABS composition on a surface layer may serve as key factors determining colorability, which in turn determines appearance of the resin.

In general, a PC/ABS composition may include a silicone resin including silicone oil and the like in order to improve injection moldability and release properties. Although the silicone resin may provide excellent release properties, the silicone resin has poor compatibility with polycarbonate. Further, polycarbonate has an index of refraction of 1.585, whereas silicone oil has an index of refraction of 1.520. Due to such a large difference in the index of refraction, the silicone resin can exhibit high interface reflectivity due to the formation of domains. Blending with polycarbonates can generate a flow mark or pearl mark, which can limit the use of such compositions for various applications, such as molded articles requiring a good appearance. Further, the silicone resin may have poor impact strength and lowered heat resistance when used together with polycarbonate.

Moreover, the polycarbonate resin composition may be used in the manufacture of exterior materials and components of electronic products. In these applications, the polycarbonate resin composition is required to have flame retardancy.

Accordingly, there is a need for a polycarbonate resin composition having improved release properties and colorability as well as excellent appearance, impact strength and flame retardancy.

SUMMARY OF THE INVENTION

The present invention provides a polycarbonate resin composition that can have excellent release properties and appearance. The polycarbonate resin composition can further have excellent impact strength, flame retardancy, and/or colorability.

The polycarbonate resin composition of the present invention includes: (A) a polycarbonate resin; (B) a polysiloxane-polycarbonate copolymer; (C) an aromatic vinyl graft copolymer; (D) a silicone resin, (E) a core-shell graft copolymer; and (F) a flame retardant.

In one embodiment, the composition includes about 100 parts by weight of a base resin including (A) about 70 wt % to about 90 wt % of the polycarbonate resin; (B) about 9 wt % to about 25 wt % of the polysiloxane-polycarbonate copolymer; and (C) about 1 wt % to about 10 wt % of the aromatic vinyl graft copolymer; (D) about 1 part by weight to about 10 parts by weight of a silicone resin; (E) about 1 part by weight to about 10 parts by weight of a core-shell graft copolymer; and (F) about 1 part by weight to about 20 parts by weight of a flame retardant, wherein the amounts of each of (D), (E), and (F) is based on about 100 parts by weight of the base resin.

The polycarbonate resin (A) may have a flow index of about 10 g/10 min to about 40 g/10 min as measured at 300° C. under a load of 1.2 kg in accordance with ISO 1133.

The polysiloxane-polycarbonate copolymer (B) may have a flow index of about 5 g/10 min to about 40 g/10 min as measured at 300° C. under a load of 1.2 kg in accordance with ISO 1133.

The aromatic vinyl graft copolymer (C) may be prepared by grafting an aromatic vinyl monomer and an unsaturated nitrile monomer to a rubbery polymer.

The silicone resin (D) may be silicone oil, a silicone polymer, or a combination thereof.

The silicone oil may have a viscosity of about 5 $mm^2/S$ to about 40 $mm^2/S$ at 25° C. The silicone oil may have a melting point of about 30° C. to about 70° C.

The silicone polymer may be a triblock copolymer of ε-caprolactone-polydialkylsiloxane-ε-caprolactone.

In one embodiment, the silicone oil and the polysiloxane-polycarbonate copolymer (B) may be present in a weight ratio of about 1:2 to about 1:5.

In another embodiment, the silicone polymer and the polysiloxane-polycarbonate copolymer (B) may be present in a weight ratio of about 1:3 to about 1:4.

The core-shell graft copolymer (E) may have a structure wherein an unsaturated monomer including an acrylic monomer forms a shell surrounding a diene rubber core.

In the aromatic vinyl graft copolymer (C), the rubbery polymer may have an average rubber particle size of about 0.2 μm to about 0.5 μm, and the core-shell graft copolymer (E) may have an average rubber core particle size of about 50 nm to about 150 nm.

The polycarbonate resin composition may further include additives selected from among lubricants, antioxidants, chemical resistant additives, surfactants, nucleating agents, coupling agents, fillers, plasticizers, impact reinforcing agents, antibacterial agents, release agents, heat stabilizers, light stabilizers, compatibilizers, inorganic additives, colorants, stabilizers, lubricating agents, antistatic agents, pigments, dyes, flame retardants, and the like, and combinations thereof.

The polycarbonate resin composition of the invention can exhibit excellent release properties, appearance, impact strength, flame retardancy and colorability.

The present invention also relates to a molded article produced from the polycarbonate resin composition. The molded article may have excellent impact strength, heat resistance, release properties, flame retardancy, appearance and/or colorability.

DETAILED DESCRIPTION OF THE INVENTION

Figure 1:
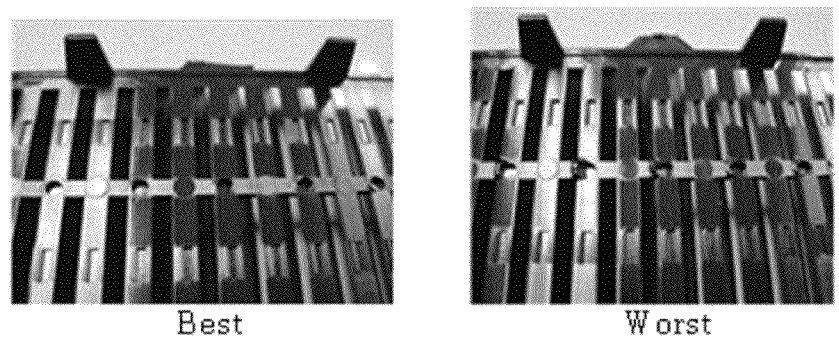
FIG. 1 shows photographs illustrating the best and worst release properties of test specimens prepared in the Examples and Comparative Examples when applied to a Grille mold.

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

A polycarbonate resin composition of the present invention includes: (A) a polycarbonate resin; (B) a polysiloxane-polycarbonate copolymer; (C) an aromatic vinyl graft copolymer; (D) a silicone resin, (E) a core-shell graft copolymer; and (F) a flame retardant. Hereinafter, each component will be explained in detail.

As used herein, the term "substituted" means that a hydrogen atom of a compound is substituted by a halogen atom, a hydroxyl group, a nitro group, a cyano group, an amino group, an azido group, an amidino group, a hydrazino group, a carbonyl group, a carbamyl group, a thiol group, an ester group, a carboxyl group or salt thereof, a sulfonic acid group or salt thereof, a phosphate group or salt thereof, a $C_1$ to $C_{20}$ alkyl group, a $C_2$ to $C_{20}$ alkenyl group, a $C_2$ to $C_{20}$ alkynyl group, a $C_1$ to $C_{20}$ alkoxy group, a $C_6$ to $C_{30}$ aryl group, a $C_6$ to $C_{30}$ aryloxy group, a $C_3$ to $C_{30}$ cycloalkyl group, a $C_3$ to $C_{30}$ cycloalkenyl group, a $C_3$ to $C_{30}$ cycloalkynyl group, or a combination thereof.

(A) Polycarbonate Resin

The polycarbonate resin (A) may be prepared by reacting one or more diphenols represented by Formula 1 with phosgene, halogen acid ester, carbonic acid ester, or a combination thereof

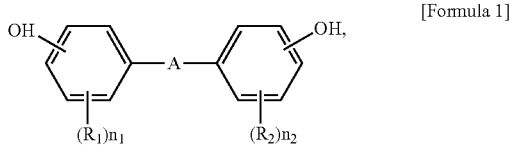

[Formula 1]

wherein A is a single bond, substituted or unsubstituted linear or branched $C_1$ to $C_{30}$ alkylene, substituted or unsubstituted $C_2$ to $C_5$ alkenylene, substituted or unsubstituted $C_2$ to $C_5$ alkylidene, substituted or unsubstituted linear or branched $C_1$ to $C_{30}$ haloalkylene, substituted or unsubstituted $C_5$ to $C_6$ cycloalkylene, substituted or unsubstituted $C_5$ to $C_6$ cycloalkenylene, substituted or unsubstituted $C_5$ to $C_{10}$ cycloalkylidene, substituted or unsubstituted $C_6$ to $C_{30}$ arylene, substituted or unsubstituted linear or branched $C_1$ to $C_{20}$ alkoxylene, halogen acid ester, carbonic acid ester, CO, S, or $SO_2$;

$R_1$ and $R_2$ are the same or different and are each independently substituted or unsubstituted $C_1$ to $C_m$ alkyl or substituted or unsubstituted $C_6$ to $C_m$ aryl; and $n_1$ and $n_2$ are the same or different and are each independently an integer from 0 to 4.

The polycarbonate resin may have a repeat unit obtained by combining two or more kinds of diphenols represented by Formula 1. Examples of diphenols include without limitation 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane, and the like, and combinations thereof. In exemplary embodiments, 2,2-bis(4-hydroxyphenyl)propane, 2,2-bis(3,5-dichloro-4-hydroxyphenyl)propane, and/or 1,1-bis(4-hydroxyphenyl)cyclohexane can be used, for example, 2,2-bis(4-hydroxyphenyl)propane can be used.

Further, as the diphenol compound, compounds such as resorcinol, hydroquinone, and the like, and combinations thereof may be used in addition to or instead of the above diphenols.

The polycarbonate resin (A) may have a weight average molecular weight of about 5,000 g/mol to about 200,000 g/mol, for example about 15,000 g/mol to about 100,000 g/mol, and as another example about 20,000 g/mol to about 80,000 g/mol.

The polycarbonate resin (A) may be a homopolymer using one kind of dihydric phenol, a copolymer or a mixture of polymers using at least two kinds of dihydric phenols, or a combination of one or more homopolymers and/or one or more copolymers.

The polycarbonate resin (A) may be a linear polycarbonate resin, a branched polycarbonate resin, a polyester carbonate copolymer resin or mixture thereof.

In one embodiment, the polycarbonate resin (A) may be a low flowability polycarbonate having a low flow index. The low flowability polycarbonate may have a flow index of about 10 g/10 min to about 40 g/10 min, for example about 15 g/10 min to about 25 g/10 min, as measured at 300° C. under a load of 1.2 kg in accordance with ISO 1133.

The polycarbonate resin (A) may be present in an amount of about 70 wt % to about 90 wt %, for example about 75 wt % to about 89 wt %, based on 100 wt % of a base resin including (A), (B), and (C). In some embodiments, the base resin may include the polycarbonate resin (A) in an amount of about 70, 71, 72, 73, 74, 75, 76, 77, 78, 79, 80, 81, 82, 83, 84, 85, 86, 87, 88, 89, or 90 wt %. Further, according to some embodiments of the present invention, the amount of the polycarbonate resin (A) can be in a range from about any of the foregoing amounts to about any other of the foregoing amounts.

When the base resin includes the polycarbonate resin (A) in an amount within this range, it is possible to obtain a resin composition exhibiting a good balance of impact strength, flowability, and/or colorability.

(B) Polysiloxane-Polycarbonate Copolymer

The polysiloxane-polycarbonate copolymer (B) may include a polycarbonate block and a polysiloxane block.

The polycarbonate block may include a structural unit derived from the polycarbonate resin (A).

The polysiloxane block may include a structural unit represented by Formula 2:

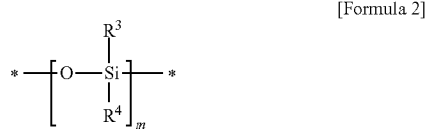

[Formula 2]

wherein $R^3$ and $R^4$ may be the same or different and are each independently hydrogen, substituted or unsubstituted $C_1$ to $C_{20}$ alkyl, substituted or unsubstituted $C_2$ to $C_{20}$ alkenyl, substituted or unsubstituted $C_2$ to $C_{20}$ alkynyl, substituted or unsubstituted $C_1$ to $C_{20}$ alkoxy, substituted or unsubstituted $C_3$ to $C_{30}$ cycloalkyl, substituted or unsubstituted $C_3$ to $C_{30}$ cycloalkenyl, substituted or unsubstituted $C_3$ to $C_{30}$ cycloalkynyl, substituted or unsubstituted $C_6$ to $C_{30}$ aryl, substituted or unsubstituted $C_6$ to $C_{30}$ aryloxy, substituted or unsubstituted $C_6$ to $C_{30}$ aryl, or NRR' (wherein, R and R' may be the same or different and are each independently hydrogen or substituted or unsubstituted $C_1$ to $C_{20}$ alkyl); and $2 \leq m < 10,000$.

In Formula 2, m is about 2 to about 10,000. In exemplary embodiments, m can be about 2 to about 1,000, for example about 10 to about 100, and as another example about 25 to about 80. Within this range, the resin composition can exhibit excellent impact resistance and appropriate viscosity, thereby rendering extrusion processing useful.

The polycarbonate-polysiloxane copolymer (B) may include about 1 wt % to about 99 wt % of the polycarbonate block and about 1 wt % to about 99 wt % of the polysiloxane block. In an exemplary embodiment, the polycarbonate-polysiloxane copolymer (B) may include about 40 wt % to about 80 wt % of the polycarbonate block and about 20 wt % to about 60 wt % of the polysiloxane block. In yet another exemplary embodiment, the polycarbonate-polysiloxane copolymer (B) may include about 80 wt % to about 95 wt % of the polycarbonate block and about 5 wt % to about 20 wt % of the polysiloxane block.

In some embodiments, the polycarbonate-polysiloxane copolymer (B) may include the polycarbonate block in an amount about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 wt %. Further, according to some embodiments of the present invention, the amount of the polycarbonate block can be in a range from about any of the foregoing amounts to about any other of the foregoing amounts.

In some embodiments, the polycarbonate-polysiloxane copolymer (B) may include the polysiloxane block in an amount about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 wt %. Further, according to some embodiments of the present invention, the amount of the polysiloxane block can be in a range from about any of the foregoing amounts to about any other of the foregoing amounts.

Within this content range, the resin composition can exhibit excellent impact resistance. The polycarbonate-polysiloxane copolymer (B) may have a weight average molecular weight of about 10,000 g/mol to about 50,000 g/mol. In one embodiment, the polycarbonate-polysiloxane copolymer (B) may have a weight average molecular weight of about 15,000 g/mol to about 30,000 g/mol. Within this range, the composition can have much better impact resistance.

The polycarbonate-polysiloxane copolymer (B) may have a melt index of about 5 g/10 min to about 40 g/10 min, for example about 10 g/10 min to about 30 g/10 min, as measured at 300° C. under a load of 1.2 kg in accordance with ISO 1133. Within this range, the resin composition can have excellent balance of mechanical properties and injection molding flowability.

In one embodiment, the polycarbonate-polysiloxane copolymer (B) can have a melt index higher than that of the polycarbonate resin (A).

The polycarbonate-polysiloxane copolymer (B) may be prepared by a typical method. In one embodiment, the polycarbonate-polysiloxane copolymer may be prepared by copolymerizing a dihydric phenolic compound containing a siloxane group with a dihydric phenolic compound. Copolymerization may be performed by interfacial polycondensation, emulsion polymerization, and the like, without being limited thereto. The polycarbonate-polysiloxane copolymer (B) may be commercially available, for example, Teflon RC 1700 from Idemistu.

In the present invention, the polysiloxane-polycarbonate copolymer (B) may be present in an amount of about 9 wt % to about 25 wt %, for example about 10 wt % to about 23 wt %, based on 100 wt % of the base resin including (A), (B), and (C). In some embodiments, the base resin may include the polysiloxane-polycarbonate copolymer (B) in an amount of about 9, 10, 11, 12, 13, 14, 15, 16, 17, 18, 19, 20, 21, 22, 23, 24, or 25 wt %. Further, according to some embodiments of the present invention, the amount of the polysiloxane-polycarbonate copolymer (B) can be in a range from about any of the foregoing amounts to about any other of the foregoing amounts.

When the base resin includes the polysiloxane-polycarbonate copolymer (B) in an amount within this range, the resin composition can have improved colorability and reduced pearl occurrence.

(C) Aromatic Vinyl Graft Copolymer

The aromatic vinyl graft copolymer (C) may be prepared by adding and polymerizing an aromatic vinyl monomer capable of being grafted to a rubbery polymer and a monomer capable of being grafted to the aromatic vinyl monomer.

Examples of the rubbery polymer may include without limitation diene rubbers such as polybutadiene, poly(styrene-butadiene), poly(acrylonitrile-butadiene), and the like; acrylic rubbers such as saturated rubbers produced by adding hydrogen to the diene rubbers; isoprene rubbers; chloroprene rubbers; acrylic rubbers such as poly(butyl acrylate); ethylene/propylene/diene (EPDM) terpolymers; and the like, and combinations thereof. In exemplary embodiments, polybutadiene rubber can be used.

The aromatic vinyl graft copolymer resin can include the rubbery polymer in an amount of about 5 wt % to about 65 wt % based on the total weight (100 wt %) of the aromatic vinyl graft copolymer resin. In some embodiments, the aromatic vinyl graft copolymer resin may include the rubbery polymer in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, or 65 wt %. Further, according to some embodiments of the present invention, the amount of the rubbery polymer can be in a range from about any of the foregoing amounts to about any other of the foregoing amounts.

The rubbery polymer may have an average rubber particle size of about 0.1 µm to about 4 µm, for example about 0.2 µm to about 1 µm, and as another example about 0.2 µm to about 0.5 µm in terms of impact strength and appearance in preparation of the graft copolymer. In some embodiments, the rubbery polymer may have an average rubber particle size of about 0.1, 0.2, 0.3, 0.4, 0.5, 0.6, 0.7, 0.8, 0.9, 1, 2, 3, or 4 µm. Further, according to some embodiments of the present invention, the average rubber particle size of the rubbery polymer can be in a range from about any of the foregoing to about any other of the foregoing.

Examples of the aromatic vinyl monomer capable of being grafted to the rubbery polymer may include without limitation styrene, α-methylstyrene, β-methylstyrene, p-methylstyrene, p-t-butylstyrene, ethyl styrene, vinyl xylene, monochlorostyrene, dichlorostyrene, dibromostyrene, vinyl-naphthalene, and the like, and combinations thereof. In exemplary embodiments, styrene can be used.

The aromatic vinyl graft copolymer resin can include the aromatic vinyl monomer in an amount of about 30 wt % to about 94 wt %, based on the total weight (100 wt %) of the aromatic vinyl graft copolymer resin. In some embodiments, the aromatic vinyl graft copolymer resin can include the aromatic vinyl monomer in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, or 94 wt %. Further, according to some embodiments of the present invention, the amount of the aromatic vinyl monomer can be in a range from about any of the foregoing amounts to about any other of the foregoing amounts.

Examples of the monomer capable of being grafted to the aromatic vinyl monomer may include without limitation unsaturated nitriles such as acrylonitrile, methacrylonitrile, and the like, and combinations thereof. In exemplary embodiments, acrylonitrile can be used.

The aromatic vinyl graft copolymer resin can include the copolymerizable monomer in an amount of about 1 wt % to about 40 wt %, based on the total weight (100 wt %) of the graft copolymer resin. In some embodiments, the aromatic vinyl graft copolymer resin can include the copolymerizable monomer in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt %. Further, according to some embodiments of the present invention, the amount of the copolymerizable monomer can be in a range from about any of the foregoing amounts to about any other of the foregoing amounts.

The aromatic vinyl graft copolymer may be acrylonitrile butadiene styrene (ABS) copolymer prepared by emulsion grafting a polybutadiene rubbery polymer to a styrene monomer and acrylonitrile in a weight ratio of about 60:40 to about 80:20, for example about 71:29 to about 75:25.

The aromatic vinyl graft copolymer (C) may be present in an amount of about 1 wt % to about 10 wt %, for example about 1 wt % to about 5 wt %, based on 100 wt % of the base resin including (A), (B), and (C). In some embodiments, the base resin can include the aromatic vinyl graft copolymer (C) in an amount of about 1, 2, 3, 4, 5, 6, 7, 8, 9, or 10 wt %. Further, according to some embodiments of the present invention, the amount of the aromatic vinyl graft copolymer (C) can be in a range from about any of the foregoing amounts to about any other of the foregoing amounts.

When the base resin includes the aromatic vinyl graft copolymer (C) in an amount within this range, the resin composition can have improved impact resistance due to increased compatibility with the polycarbonate resin.

In one embodiment, the polysiloxane-polycarbonate copolymer (B) and the aromatic vinyl graft copolymer (C) may be present in a weight ratio ((B):(C)) of about 2:1 to about 10:1. Within this range, the resin composition can exhibit a good balance of impact strength, flame retardancy and flowability.

(D) Silicone Resin

In the present invention, the silicone resin (D) may serve to increase release properties and appearance. The silicone resin may be used together with the polysiloxane-polycarbonate copolymer (B) to maintain impact strength and flame retardancy while increasing colorability.

Examples of the silicone resin (D) may include without limitation silicone oil, silicone polymers, and the like, and combinations thereof. In exemplary embodiments, both silicone oil and silicone polymer can be used as the silicone resin.

Examples of the silicone oil may include without limitation polydimethyl siloxane; modified polydimethyl siloxane wherein at least one methyl group in a branch or terminal of polydimethyl siloxane is modified by a hydrogen atom, an C1-C10 alkyl group, a cyclohexyl group, a phenyl group, a benzyl group, an epoxy group, a polyether group, a carboxylic group, a mercapto group, a chloroalkyl group, an alkyl alcohol ester group, an alcohol group, an allyl group, a vinyl group, a trifluoromethyl group, or a combination thereof; and combinations thereof. In exemplary embodiments, the silicone oil is dimethyl silicone oil and/or methylphenyl silicone oil, for example, methylphenyl silicone oil.

The silicone oil may have a viscosity from about 5 $mm^2/S$ to about 40 $mm^2/S$, for example from about 10 $mm^2/S$ to about 35 $mm^2/S$ at 25° C. Within this viscosity range, the resin composition can have excellent processability.

Further, the silicone oil may have a melting point from about 30° C. to about 70° C., for example from about 35° C. to about 65° C. Within this range, the resin composition can have good processability and minimal or no appearance defects.

In this invention, the weight ratio of the silicone oil to the polysiloxane-polycarbonate copolymer (B) may range from about 1:2 to about 1:30. Within this content range, the silicone oil and the polysiloxane-polycarbonate copolymer may be present in a weight ratio of about 1:2 to about 1:5 in order to maximize compatibility between the silicone oil and the polycarbonate.

Examples of the silicone polymer may include without limitation copolymers of ϵ-caprolactone and polydialkylsiloxane, for example, triblock copolymers of ϵ-caprolactone-polydialkylsiloxane-ϵ-caprolactone. In the polydialkylsiloxane, each alkyl is independently $C_1$ to $C_5$ alkyl, for example $C_1$ to $C_2$ alkyl. For example, the silicone polymer may include a polydimethyl siloxane block and a polydiethyl siloxane block therein.

The weight ratio of the silicone polymer to the polysiloxane-polycarbonate copolymer (B) may range from about 1:2 to about 1:20. Within this range, the silicone polymer and the polysiloxane-polycarbonate copolymer may be present in a weight ratio of about 1:3 to about 1:4 in order to maximize compatibility between the silicone polymer and the polycarbonate.

The polycarbonate resin composition may include the silicone resin (D) in an amount of about 1 part by weight to about 10 parts by weight, for example about 2 parts by weight to about 8 parts by weight, and as another example about 3 parts by weight to about 7 parts by weight, based on about 100 parts by weight of the base resin including (A), (B), and (C). In some embodiments, the polycarbonate resin composition may include the silicone resin (D) in an amount of about 1, 2, 3, 4, 5, 6, 7, 8, 9, or 10 parts by weight. Further, according to some embodiments of the present invention, the amount of the silicone resin (D) can be in a range from about any of the foregoing amounts to about any other of the foregoing amounts.

When the polycarbonate resin composition includes the silicone resin (D) in an amount within this range, the resin composition can exhibit both improved release properties and colorability.

In one embodiment, as the silicone resin (D), the silicone oil can be used in combination with the silicone polymer. In this case, the weight ratio of the silicone oil to the silicone polymer can range from about 1:1.2 to about 1:5. Within this range, property balance between colorability and release properties can be adjusted.

In one embodiment, the polysiloxane-polycarbonate copolymer (B) and the silicone resin (D) may be present in a weight ratio ((B):(D)) from about 1.5:1 to about 5:1. Within this range, property balance between impact strength and release properties flowability can be attained.

(E) Core-Shell Graft Copolymer

The core-shell graft copolymer (E) may have a core-shell structure wherein an unsaturated monomer containing an acrylic monomer forms a shell on a rubber core.

Examples of the rubber core may include without limitation rubbery polymers polymerized from a diene monomer, an acrylic monomer and the like, and combinations thereof. In exemplary embodiments, a diene monomer can be used.

Examples of the diene monomer may include without limitation $C_4$ to $C_6$ butadiene, isoprene, and the like, and combinations thereof. In exemplary embodiments, butadiene may be used.

Examples of the acrylic monomers may include without limitation methyl (meth)acrylate, ethyl (meth)acrylate, n-propyl (meth)acrylate, n-butyl (meth)acrylate, hexyl (meth)acrylate, 2-ethylhexyl (meth)acrylate, and the like, and combinations thereof.

Examples of the rubbery polymer may include without limitation butadiene rubbers, acrylic rubbers, styrene/butadiene rubbers, acrylonitrile/butadiene rubbers, isoprene rubbers, ethylene-propylene-diene terpolymer (EPDM), and the like, and combinations thereof.

The rubber core can have an average particle size from about 50 nm to about 150 nm, for example from about 70 nm to about 110 nm. Within this particle size range, the resin composition can maintain suitable impact strength while possessing excellent appearance.

In the aromatic vinyl graft copolymer (C) of the invention, the rubbery polymer can have a larger average rubber particle size than the average rubber particle size of the core-shell graft copolymer (E). In this case, a suitable balance between impact strength and appearance can be attained.

As the acrylic monomer among unsaturated monomers constituting the shell component, $C_1$ to $C_{10}$ alkyl (meth)acrylate may be used. Examples of the acrylic monomer may include without limitation methyl (meth)acrylate, ethyl (meth)acrylate, propyl (meth)acrylate, butyl (meth)acrylate, and the like, and combinations thereof. In exemplary embodiments, methyl(meth)acrylate can be used.

As the unsaturated monomer constituting the shell component, an aromatic vinyl monomer may be used. Examples of the aromatic vinyl monomer may include without limitation styrene, $C_1$ to $C_{10}$ alkyl substituted styrenes, halogen substituted styrenes, and the like, and combinations thereof. Examples of the alkyl substituted styrene may include without limitation o-ethyl styrene, m-ethyl styrene, p-ethylstyrene, α-methyl styrene, and the like, and combinations thereof.

The core-shell graft copolymer (E) may include about 30 wt % to 80 wt % of the rubber core and about 20 wt % to 70 wt % of the unsaturated monomer including the acrylic monomer.

In some embodiments, the core-shell graft copolymer (E) may include the rubber core in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments of the present invention, the amount of the rubber core can be in a range from about any of the foregoing amounts to about any other of the foregoing amounts.

In some embodiments, the core-shell graft copolymer (E) may include the unsaturated monomer including the acrylic monomer in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt %. Further, according to some embodiments of the present invention, the amount of the unsaturated monomer including the acrylic monomer can be in a range from about any of the foregoing amounts to about any other of the foregoing amounts.

Within this range, the resin composition can have improved dispersibility, thereby enhancing impact strength.

Examples of the core-shell graft copolymer (E) may include a methacrylate-butadiene-styrene (MBS) copolymer.

The polycarbonate resin composition may include the core-shell graft copolymer (E) in an amount of about 1 part by weight to about 10 parts by weight, for example about 1 part by weight to about 5 parts by weight, based on about 100 parts by weight of the base resin including (A), (B), and (C). In some embodiments, the polycarbonate resin composition may include the core-shell graft copolymer (E) in an amount of about 1, 2, 3, 4, 5, 6, 7, 8, 9, or 10 parts by weight. Further, according to some embodiments of the present invention, the amount of the core-shell graft copolymer (E) can be in a range from about any of the foregoing amounts to about any other of the foregoing amounts.

When the polycarbonate resin composition includes the core-shell graft copolymer (E) in an amount within this range, the resin composition can exhibit excellent appearance/dimensional stability without deteriorating flame retardancy.

In one embodiment, the polysiloxane-polycarbonate copolymer (B) and the core-shell graft copolymer (E) may be present in a weight ratio ((B):(E)) from about 2:1 to about 8:1.

Further, the silicone resin (D) and the core-shell graft copolymer (E) may be present in a weight ratio ((D):(E)) from about 1:1.5 to about 1:6. Within this range, the composition can exhibit an improved property balance between flowability, impact strength and appearance.

(F) Flame Retardant

Examples of the flame retardant can include without limitation phosphorus flame retardants, halogen flame retardants, sulfonate flame retardants, and the like, and combinations thereof. In exemplary embodiments, a phosphorus flame retardant can be used.

The term phosphorus flame retardant refers to a flame retardant containing phosphorus. Examples of the phosphorus flame retardant can include without limitation red phosphorus, phosphates, phosphonates, phosphinates, phosphine oxide, phosphazenes, metal salts thereof, and the like, and combinations thereof.

As the halogen flame retardant, any halogen compound capable of acting as a flame retardant may be used without limitation. For example, commercially available halogen flame retardants such as but not limited to decabromo diphenyl ether, decabromo diphenyl ethane, tetrabromo bisphenol-A, tetrabromo bisphenol-A epoxy oligomer, octabromo trimethylphenyl indane, ethylene-bis-tetrabromophthalimide, tris (tribromophenol)triazine, brominated polystyrene, and the like, and combinations thereof may be used. The halogen flame retardant can include a halogen compound capable of melting at a typical processing temperature, for example, a halogen compound having a melting point or softening point of about 250° C. or less.

Examples of the sulfonate flame retardant can include without limitation perfluoroalkane alkali metal sulfonates, perfluoroalkane ammonium sulfonates, alkali metal salts and/or alkaline earth salts of aromatic sulfonates, and the like, and combinations thereof.

The polycarbonate resin composition can include the flame retardant in an amount of about 1 part by weight to about 20 parts by weight, for example about 10 parts by weight to about 16 parts by weight, based on about 100 parts by weight of the base resin including (A), (B), and (C). In some embodiments, the polycarbonate resin composition may include the flame retardant in an amount of about 1, 2, 3, 4, 5, 6, 7, 8, 9, 10, 11, 12, 13, 14, 15, 16, 17, 18, 19, or 20 parts by weight. Further, according to some embodiments of the present invention, the amount of the flame retardant can be in a range from about any of the foregoing amounts to about any other of the foregoing amounts When the polycarbonate resin composition includes the flame retardant in an amount within this range, the resin composition can exhibit high impact, high flame retardancy and thin layer molding.

Besides the aforementioned components, the polycarbonate resin composition may further include one or more additives. Examples of the additives may include without limitation lubricants, antioxidants, chemical resistant additives, surfactants, nucleating agents, coupling agents, fillers, plasticizers, impact reinforcing agents, antibacterial agents, release agents, heat stabilizers, light stabilizers, compatibilizer, inorganic additives, colorants, stabilizers, lubricating agents, antistatic agents, pigments, dyes, flame retardant, and the like. These may be used alone or in combination thereof.

The polycarbonate resin composition may be prepared by a typical method for preparing resin compositions. For example, in one embodiment, the components and other additives may be simultaneously mixed and extruded through an extruder to prepare the resin composition in pellet form.

The present invention also provides a molded article prepared by molding the polycarbonate resin composition. That is, the polycarbonate resin composition may be formed into a molded article via various processes, such as injection molding, blow molding, extrusion molding, and heat molding. The resin composition can be useful for molded articles, for example, electric and electronic components and automobile components requiring molding and releasing.

The molded article may have a flame retardancy rating of V-0 or more as measured on a 2 mm thick specimen in accordance with UL94 and an impact strength of about 35 kgf·cm/cm or more, for example, from about 36 kgf·cm/cm to about 90 kgf·cm/cm as measured on a ⅛" thick specimen in accordance with ASTM D256.

Further, the molded article may have a flowability of about 32 g/10 min or more, for example, from about 32 g/10 min to about 50 g/10 min, as measured at 220° C. under a load of 10 kg in accordance with ISO 1133.

Next, the present invention will be explained in more detail with reference to some examples. It should be understood that these examples are provided for illustration only and are not to be in any way construed as limiting the present invention. Descriptions of details apparent to those skilled in the art will be omitted.

EXAMPLES

Details of components used in the following examples and comparative examples are as follows.

(A) Polycarbonate resin (PC): SC-1190 produced by Cheil Industries Inc. and having a melt flow index of 20 g/10 min (measured at 300° C. and 1.2 kgf) in accordance with ISO 1133 is used.

(B) Polysiloxane-polycarbonate copolymer: RC 1700 produced by Idemitsu Chemicals and having a melt flow index of 27 g/10 min (measured at 300° C. and 1.2 kgf) in accordance with ISO 1133 is used.

(C) Aromatic vinyl graft copolymer: To a mixture of 50 parts by weight of solid butadiene rubber latex (310 nm), 36 parts by weight of styrene, 14 parts by weight of acrylonitrile and 150 parts by weight of deionized water, 1.0 part by weight of potassium oleate, 0.4 parts by weight of cumene hyderoxide, 0.2 parts by weight of n-octyl mercaptan, 0.4 parts by weight of glucose, 0.01 parts by weight of iron sulfate hydrate, and 0.3 parts by weight of sodium pyrophosphate are added. The mixture is subjected to reaction at 75° C. for 5 hours to prepare a graft copolymer resin. To the resulting resin solid, 0.4 parts by weight of sulfuric acid is added and coagulated to obtain a grafted acrylonitrile-butadiene-styrene copolymer (g-ABS) in a powder state.

(D) Silicone Resin (D1) Silicone oil: TSF 437 produced by GE Toshiba and having viscosity of 22 m$^2$/S at 25° C. is used.

(D2) Silicone oil: MI 010 produced by Siren and having viscosity of 10 m$^2$/S at 25° C. is used.

(D3) Silicone polymer: caprolactone-dimethylsiloxane-caprolactone triblock copolymer manufactured by Evonik (Tegomer H-Si 6440) is used.

(E) Core-shell graft copolymer: MBS resin (BTA-731 produced by R&H) comprising a butadiene rubber having an average particle size of 100 nm is used.

(F) Flame retardant: CR-741 which is bisphenol A bis (diphenylphosphate) and produced by Daihachi is used.

Examples 1 to 6

The above components are added in amounts as listed in Table 1, and mixed in a typical mixer, followed by extrusion through a twin-screw extruder having a diameter of 45 mm and L/D=35 at 240° C. to prepare extrudates in pellet form. The prepared pellets are injection-molded in a 10 oz injection molding machine at an injection temperature of 250° C. to prepare specimens. The specimens are left at 23° C. and 50% relative humidity for 48 hours.

Comparative Example 1

Specimens are prepared in the same manner as in Example 1 except that the (B) polysiloxane-polycarbonate copolymer is not employed.

Comparative Example 2

Specimens are prepared in the same manner as in Example 1 except that the (C) aromatic vinyl graft copolymer is not employed.

Comparative Example 3

Specimens are prepared in the same manner as in Example 1 except that the (D) silicone resin is not employed.

Comparative Example 4

Specimens are prepared in the same manner as in Example 1 except that the (E) core-shell graft copolymer is not employed.

Comparative Example 5

Specimens are prepared in the same manner as in Example 1 except that the (D) silicone resin is employed in excess amount.

Comparative Example 6

Specimens are prepared in the same manner as in Example 1 except that the (E) core-shell graft copolymer is employed in excess amount.

TABLE 1

|   |    | Example |    |    |    |    |    | Comparative Example |    |    |    |    |    |
|---|----|---------|----|----|----|----|----|--------------------|----|----|----|----|----|
|   |    | 1       | 2  | 3  | 4  | 5  | 6  | 1  | 2  | 3  | 4  | 5  | 6  |
| A |    | 85      | 75 | 75 | 75 | 85 | 85 | 90 | 90 | 85 | 85 | 85 | 85 |
| B |    | 10      | 20 | 20 | 20 | 10 | 10 | —  | 10 | 10 | 10 | 10 | 10 |
| C |    | 5       | 5  | 5  | 5  | 5  | 5  | 10 | —  | 5  | 5  | 5  | 5  |
| D | D1 | 5       | 5  | —  | —  | 2  | —  | 5  | 5  | —  | 5  | 11 | 5  |
| D | D2 | —       | —  | 5  | —  | —  | 2  | —  | —  | —  | —  | —  | —  |
| D | D3 | —       | —  | —  | 5  | 3  | 3  | —  | —  | —  | —  | —  | —  |
| E |    | 3       | 3  | 3  | 3  | 3  | 3  | 3  | 3  | 3  | —  | 3  | 11 |
| F |    | 15      | 15 | 15 | 15 | 15 | 15 | 15 | 15 | 15 | 15 | 15 | 15 |

※ A to C are represented in terms of wt %, and D to F are represented in terms of parts by weight.

The specimens prepared in the examples and the comparative examples are evaluated by measuring physical properties as follows. Results are shown in Table 2.

<Evaluation Method of Physical Properties>

1. Izod impact strength ((kgf·cm/cm): Izod impact strength is evaluated in accordance with ASTM D-256 (⅛", notched).

2. Flow Index (g/10 min): Flow index is measured at 220° C. under a load of 10 kg in accordance with ISO 1133.

3. Heat resistance (° C.): Heat resistance is measured under a load of 5 kg in accordance with ISO R306.

4. Flame retardancy: Flame retardancy is measured on a 2 mm thick specimen in accordance with UL 94 V.

5. Release properties: When employing a Grille mold shown in FIG. 1, changes in Grille distance, deflection in backside hole and deflection degree of eject pin mark are observed by the naked eye. Evaluation is based on the standard of best, good, moderate, bad, worse, and worst. The best and worst results of release properties are shown in FIG. 1.

Figure 2:
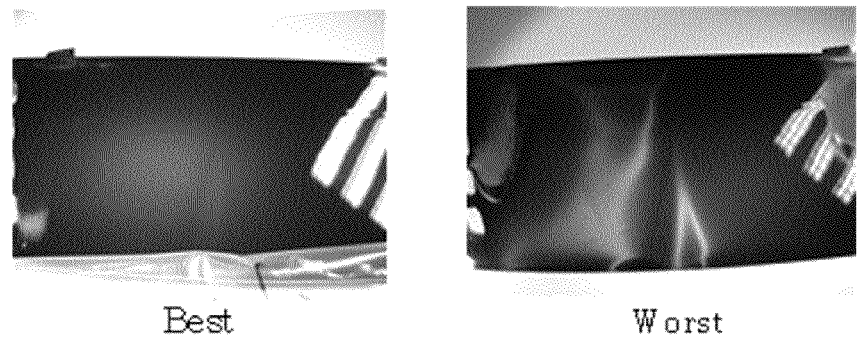
FIG. 2 shows photographs illustrating the best and worst appearance properties of test specimens prepared in the Examples and Comparative Examples when the specimens are subjected to flow mark measurement testing at welded portions.

6. Flow mark: Colorability around weld portions and amounts of pearl mark are evaluated with the naked eye. Evaluation is based on the standard of best, good, moderate, bad, worse, and worst stages. The best and worst results of flow mark are shown in FIG. 2.

TABLE 2

|                            | Example |      |      |      |      |      | Comparative Example |      |       |      |      |      |
|----------------------------|---------|------|------|------|------|------|---------------------|------|-------|------|------|------|
|                            | 1       | 2    | 4    | 6    | 7    | 8    | 1    | 2    | 3     | 4    | 5    | 6    |
| Izod impact strength (kg · cm/cm) | 45 | 48 | 53 | 40 | 35 | 43 | 55 | 22 | 48 | 45 | 40 | 65 |
| Flow index (g/10 min)      | 34      | 38   | 40   | 38   | 33   | 37   | 30   | 35   | 28    | 36   | 50   | 32   |
| Heat resistance (° C.)     | 95      | 94   | 93   | 94   | 93   | 94   | 89   | 99   | 97    | 93   | 90   | 90   |
| Flame retardant            | V0      | V0   | V0   | V0   | V0   | V0   | V1   | V0   | V0    | V0   | V1   | V1   |
| Release properties         | best    | best | best | best | best | best | best | best | worse | best | best | best |
| Flow Mark/Colorability     | good    | best | good | best | good | best | bad  | good | best  | mod  | mod  | good |

As shown in Table 2, the polycarbonate resin compositions of the present invention exhibit excellent release properties, appearance, impact strength and flowability. In Comparative Example 1 wherein the (B) polysiloxane-polycarbonate copolymer is not employed, the composition shows decreased heat resistance, flowability and appearance. In Comparative Example 2 wherein the (C) aromatic vinyl graft copolymer is not employed, the composition shows decreased impact strength. In Comparative Example 3 wherein the (D) silicone resin is not employed, the composition shows decreased flowability and release properties. In Comparative Example 4 wherein the (E) core-shell graft copolymer is not employed, the composition shows decreased appearance due to the pearl mark. In Comparative Example 5 wherein the (D) silicone resin is used in excessive amount, the composition shows decreased heat resistance and appearance. In Comparative Example 6 wherein the (E) core-shell graft copolymer is used in excessive amount, the composition shows decreased heat resistance.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

That which is claimed is:

1. A polycarbonate resin composition, comprising:
   about 100 parts by weight of a base resin comprising (A) about 70 wt % to about 90 wt % of a polycarbonate resin; (B) about 9 wt % to about 25 wt % of a polysiloxane-polycarbonate copolymer; and (C) about 1 wt % to about 10 wt % of an aromatic vinyl graft copolymer;
   (D) about 1 part by weight to about 10 parts by weight of a silicone resin based on about 100 parts by weight of the base resin;
   (E) about 1 part by weight to 10 parts by weight of a core-shell graft copolymer based on about 100 parts by weight of the base resin; and
   (F) about 1 part by weight to about 20 parts by weight of a flame retardant based on about 100 parts by weight of the base resin,
   wherein the aromatic vinyl graft copolymer (C) has an average particle size of about 0.2 µm to about 0.5 µm, and
   wherein the flame retardant includes phosphorous, halogen, sulfonate, or a combination thereof.

2. The polycarbonate resin composition according to claim 1, wherein the polycarbonate resin (A) has a flow index of about 10 g/10 min to about 40 g/10 min as measured at 300° C. under a load of 1.2 kg in accordance with ISO 1133.

3. The polycarbonate resin composition according to claim 1, wherein the polysiloxane-polycarbonate copolymer (B) has a flow index of about 5 g/10 min to about 40 g/10 min as measured at 300° C. under a load of 1.2 kg in accordance with ISO 1133.

4. The polycarbonate resin composition according to claim 1, wherein the aromatic vinyl graft copolymer (C) is prepared by grafting an aromatic vinyl monomer and an unsaturated nitrile monomer to a rubbery polymer.

5. The polycarbonate resin composition according to claim 1, wherein the silicone resin (D) includes a silicone oil, a silicone polymer, or a combination thereof.

6. The polycarbonate resin composition according to claim 5, wherein the silicone oil has a viscosity of about 5 $mm^2$/S to about 40 $mm^2$/S at 25° C.

7. The polycarbonate resin composition according to claim 5, wherein the silicone oil has a melting point of about 30° C. to about 70° C.

8. The polycarbonate resin composition according to claim 5, wherein the silicone polymer is a triblock copolymer of ε-caprolactone-polydialkylsiloxane-ε-caprolactone.

9. The polycarbonate resin composition according to claim 5, wherein the silicone oil and the polysiloxane-polycarbonate copolymer (B) are present in a weight ratio from about 1:2 to about 1:5.

10. The polycarbonate resin composition according to claim 5, wherein the silicone polymer and the polysiloxane-polycarbonate copolymer (B) are present in a weight ratio from about 1:3 to about 1:4.

11. The polycarbonate resin composition according to claim 1, wherein the core-shell graft copolymer (E) has a structure wherein an unsaturated monomer including an acrylic monomer forms a shell surrounding a diene rubber core.

12. The polycarbonate resin composition according to claim 1, wherein the core-shell graft copolymer (E) has an average rubber core particle size of about 50 nm to about 150 nm.

13. The polycarbonate resin composition according to claim 1, further comprising at least one additive selected from the group consisting of lubricants, antioxidants, chemical resistant additives, surfactants, nucleating agents, coupling agents, fillers, plasticizers, impact reinforcing agents, antibacterial agents, release agents, heat stabilizers, light stabilizers, compatibilizers, inorganic additives, colorants, stabilizers, lubricating agents, antistatic agents, pigments, dyes, additional flame retardants, and mixtures thereof.

14. A molded article produced from the polycarbonate resin composition according to claim 1.

* * * * *

UNITED STATES PATENT AND TRADEMARK OFFICE
CERTIFICATE OF CORRECTION

PATENT NO.        : 9,034,959 B2                                    Page 1 of 1
APPLICATION NO.   : 13/924954
DATED             : May 19, 2015
INVENTOR(S)       : Kyuong-Sik Chin et al.

It is certified that error appears in the above-identified patent and that said Letters Patent is hereby corrected as shown below:

In the Specification

Column 3, Line 61 reads: "dently substituted or unsubstituted $\cancel{C_1 \text{ to } C_m}$ alkyl or substi-"
and should read: "dently substituted or unsubstituted $\underline{C_1 \text{ to } C_{30}}$ alkyl or substi-"

Column 3, Line 62 reads: "tuted or unsubstituted $\cancel{C_6 \text{ to } C_m}$ aryl; and"
and should read: "tuted or unsubstituted $\underline{C_6 \text{ to } C_{30}}$ aryl; and"

Signed and Sealed this
Second Day of February, 2016

Michelle K. Lee
*Director of the United States Patent and Trademark Office*